United States Patent
Knipper

(10) Patent No.: US 8,378,260 B2
(45) Date of Patent: Feb. 19, 2013

(54) METHOD AND DEVICE FOR PERMANENTLY CONNECTING COMPONENTS OF HEAT-MELTABLE, METALLIC MATERIALS

(75) Inventor: Werner Knipper, Rhauderfehn (DE)

(73) Assignee: Meyer Werft GmbH, Papenburg (DE)

( * ) Notice: Subject to any disclaimer, the term of this patent is extended or adjusted under 35 U.S.C. 154(b) by 501 days.

(21) Appl. No.: 12/451,444

(22) PCT Filed: May 6, 2008

(86) PCT No.: PCT/DE2008/000762
§ 371 (c)(1),
(2), (4) Date: Dec. 24, 2009

(87) PCT Pub. No.: WO2008/138304
PCT Pub. Date: Nov. 20, 2008

(65) Prior Publication Data
US 2010/0108655 A1    May 6, 2010

(30) Foreign Application Priority Data

May 15, 2007  (DE) .......... 10 2007 022 863

(51) Int. Cl.
| | | |
|---|---|---|
| B23K 9/23 | (2006.01) | |
| B23K 35/30 | (2006.01) | |
| B23K 35/36 | (2006.01) | |
| B23K 9/18 | (2006.01) | |
| B23K 25/00 | (2006.01) | |
| B23K 9/12 | (2006.01) | |
| B23K 9/10 | (2006.01) | |

(52) U.S. Cl. .............. 219/137 WM; 219/73; 219/124.4; 219/124.5; 219/125.1; 219/130.01; 219/130.21; 219/130.5; 219/137.71; 901/42

(58) Field of Classification Search .................. None
See application file for complete search history.

(56) References Cited

U.S. PATENT DOCUMENTS 3,999,031 A * 12/1976 Yonezawa et al. ....... 219/121.14
4,258,242 A *  3/1981 Fujimori et al. .............. 219/61
(Continued)

FOREIGN PATENT DOCUMENTS

| DE | 195 00 512 | 4/1996 |
|---|---|---|
| DE | 198 49 117 | 5/2000 |

(Continued)

OTHER PUBLICATIONS

Staufer, H., High productivity by using Laser-GMAW- and Laser-Tandem-Hybrid-processes for thick plates. Jul. 2005. Welding in the World. Elsevier/International Institute of Welding, Roissy, FR. vol. 49. pp. 66-74.*

(Continued)

*Primary Examiner* — Hoang-Quan Ho
(74) *Attorney, Agent, or Firm* — Collard & Roe, P.C.

(57) ABSTRACT

The invention relates to a method for permanently interconnecting components from a heat-meltable metal material, using a robot-controlled welding unit for carrying out a hybrid welding process. According to the method, a high performance metal active gas welding process (high performance MAG) is carried out. A component (8) carrying out the high performance MAG welding process is carried along by the robot-controlled welding unit (2) to carry out the hybrid welding process, the GSMAW torch (3) which contributes to the hybrid welding process being guided so as to be dragged by the welding unit.

7 Claims, 1 Drawing Sheet

U.S. PATENT DOCUMENTS

| | | | | |
|---|---|---|---|---|
| 5,308,409 | A | * | 5/1994 | Kamimura et al. ............ 148/512 |
| 5,532,445 | A | * | 7/1996 | Junker ............................. 219/61 |
| 5,532,454 | A | * | 7/1996 | Kuhnen .................... 219/137 R |
| 5,821,493 | A | | 10/1998 | Beyer et al. |
| 7,241,971 | B2 | * | 7/2007 | Bonnet ................. 219/137 WM |
| 2006/0243704 | A1 | * | 11/2006 | Matz et al. ....................... 219/74 |

FOREIGN PATENT DOCUMENTS

| | | |
|---|---|---|
| DE | 19849117 B4 * | 5/2000 |
| WO | WO 00/24543 | 5/2000 |

OTHER PUBLICATIONS

Staufer, H., "High productivity by using Laser-GMAW- and Laser-Tandem-Hybrid-processes for thick plates," Welding in the World, Elsevier/International Institute of Welding, Roissy, FR, vol. 49, Jul. 2005, pp. 66-74. XP-001239964 (ISR).

Tusek, J. et al., "Hybrid welding with arc and laser beam," Science and Technology of Welding and Joining, Institute of Materials, London, GB, vol. 4, No. 5, Oct. 1999, pp. 308-311. XP-009071730 (ISR).

International Search Report.

Decision of the German Patent and Trademark Office dated Apr. 27, 2012 issued during a German opposition against German Application No. 10 2007 022 863.7 with English translation of same.

Staufer, H., Rührnösl, M.: Für große Blechdicken and hohe Schweißgeschwindigkeiten: Laserhybrid- + Tandemschweißen (in English—for great sheet thickness and high welding speed: laser hybrid and tandem welding). Der Praktiker, 2006, No. 10, pp. 300-302. (with computer-generated English translation of the relevant parts) (Decision).

Walz, C. et al: Systemvergleich zum Laser-MSG-Hybridschweißen mit unterschiedlichen Strahlquellen an Stahl und Aluminium-legierungen (in English—System comparison of laser-MSG-hybrid welding with different stream sources of steel and aluminum alloys). Proceedings of the 3$^{rd}$ Symposium of welding in shipbuilding and engineering construction of the DVS, GL SLV north. Hamburg, Apr. 2002, pp. 51-65. (with computer-generated English translation of the relevant parts) (Decision).

Information Sheet DVS 0909-1. Fundamentals of the MSG-high powered-welding with solid wire electrodes, Definitions and Concepts. Düsseldorf, Publisher for welding and related methods DVS Verlag GmbH, Sep. 2000, total pages: 5. (with computer-generated English translation of the relevant parts) (Decision).

Information Sheet DVS 0909-2. Fundamentals of the MSG-high powered-welding with solid wire electrodes, Application techniques details. Düsseldorf, Publisher for welding and related methods DVS Verlag GmbH, Jun. 2003, total pages: 8. (with computer-generated English translation of the relevant parts) (Decision).

\* cited by examiner

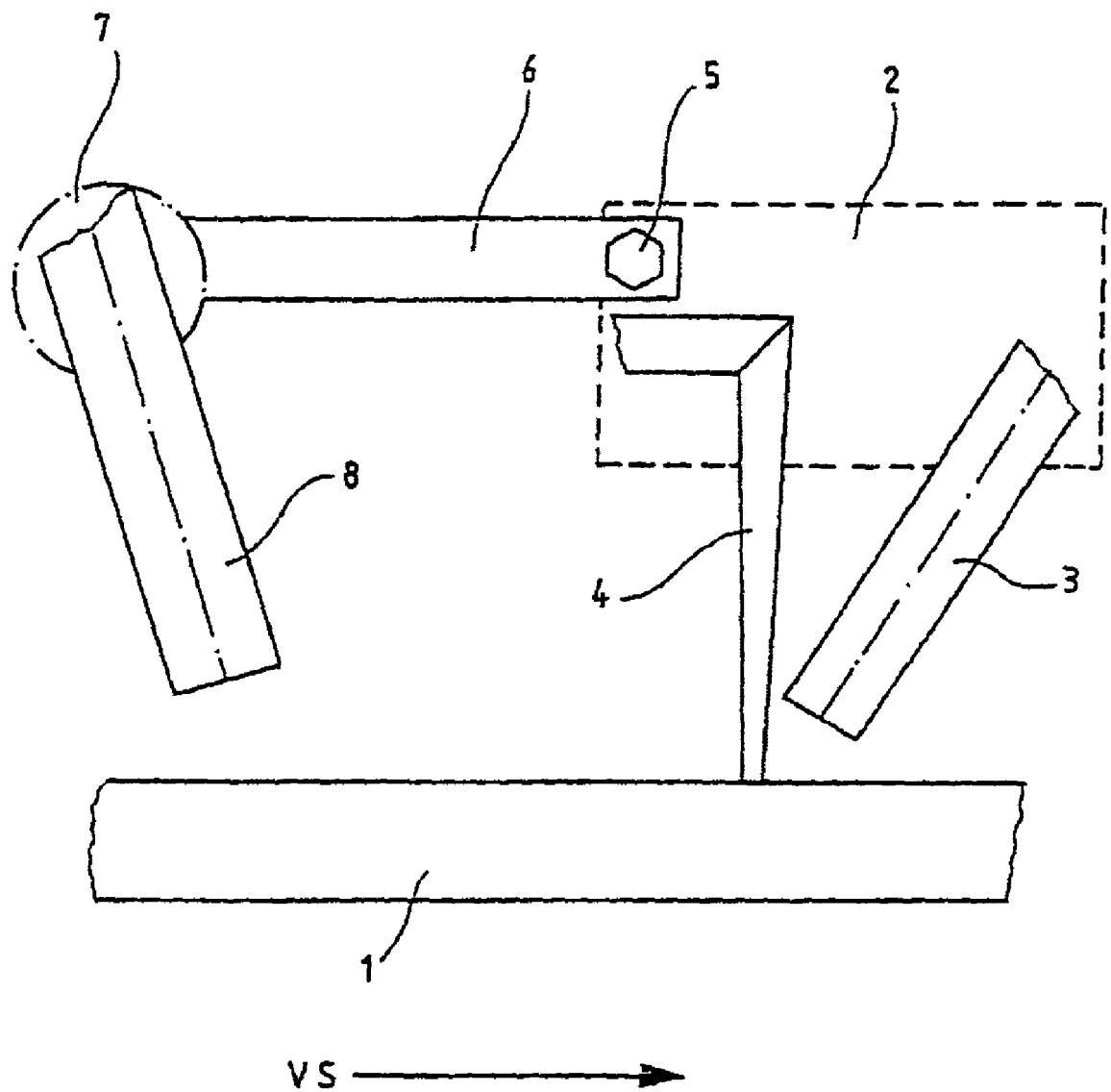

METHOD AND DEVICE FOR PERMANENTLY CONNECTING COMPONENTS OF HEAT-MELTABLE, METALLIC MATERIALS

CROSS REFERENCE TO RELATED APPLICATIONS

This application is the National Stage of PCT/DE2008/000762 filed on May 6, 2008, which claims priority under 35 U.S.C. §119 of German Application No. 10 2007 022 863.7 filed on May 15, 2007. The international application under PCT article 21(2) was not published in English.

The invention relates to a method for permanently connecting components of heat-meltable, metallic material, with a robot-controlled welding unit for carrying out a hybrid welding process.

The invention also relates to a device for carrying out the above-mentioned method.

Methods and devices of the type designated above are used industrially inter alia in the joining of thick plate, as is used in particular in shipbuilding.

It has been found that a pure laser hybrid welding, a combination of laser welding and gas metal arc welding (GMA) with thick plate of for example 15 mm, leads to the development of a so-called "middle rib defect", which is generally due to a hot crack problem. Particularly in the case of great plate thicknesses of for example 15 mm and more, the weld seam must be re-welded due to hot crack problems which occur. The additional re-welding is mostly a submerged arc welding method.

The re-welding of the hybrid seam, especially the re-welding by the submerged arc welding method, has the disadvantage that the risk exists of displacement of the middle rib defect into the root region of the hybrid seam. This can mean that the root of the weld seam, which is already re-worked by the submerged arc welding method, must likewise be re-welded. This requires further working steps once again, namely the piece which is already welded must be turned and the seam must be welded once again, now on its other side.

The submerged arc welding method used for the re-welding also has in addition the disadvantage that the introduction of heat into the thick plate and hence its distortion is not inconsiderable.

Furthermore, a seam elevation, formed by the submerged arc welding method is greatly pronounced, which is regarded as visually unadvantageous, particularly in shipbuilding, in the outer skin region there.

The invention is based on the problem of preventing the risk of crack formation, i.e. the development of middle rib defects, in the hybrid welding of thick plates.

In the method according to the invention for permanently connecting components of heat-meltable, metallic material, a robot-controlled welding unit is used for carrying out a hybrid welding process. According to the invention, a High Performance Metal Active Gas welding process (HP-MAG) is carried out at predetermined interval following the hybrid welding process.

As soon as the weld seam of the preceding hybrid welding process begins to cool down, the subsequent additional HP-MAG process according to the invention already follows, by which the cracks are eliminated.

A hybrid welding process can be any combination of different welding processes.

Particularly advantageously, to carry out the hybrid welding process a submerged arc welding process (SAW) is carried out in combination with a laser welding process. Such laser hybrid welding processes offer substantially economic advantages, because a single-layer welding in connection with the saving of additional weld joint preparation is possible, whereby particularly in the case of greater plate thicknesses, single-side welding technologies can be converted, in particular on such components in the case of which no accessibility exists for the opposite side of the weld joint, as frequently occurs in shipbuilding.

The torch carrying out the HP-MAG welding process is advantageously arranged on a structural unit which is carried and entrained by the robot-controlled welding unit to carry out the hybrid welding process. The hybrid welding process and subsequent HP-MAG welding process are consequently carried out at the same welding speed along a seam, whereby the method according to the invention can also be designated as a "tandem welding method".

The SAW torch engaging in the carrying out of the hybrid welding process is arranged aligned on the welding unit such that it is inclined in a dragging manner in the welding direction.

The torch engaging in the carrying out of the high performance metal active gas welding process (HP-MAG) is guided in a piercing manner on the welding unit. This alignment of the leading SAW torch guided as a dragged torch and the following HP-MAG torch as piercing, allows optimum welding results at high welding speeds.

With plate thicknesses of approximately 13 to 22 mm, a fault-free, two-layer welding takes place by the method according to the invention in a single travel of the robot-controlled welding unit, which additionally carries the structural unit guiding the second torch. It has been found that with plate thicknesses of 18 to 20 mm thickness, an interval between welding unit and structural unit of approximately 150 to 400 mm is advantageous, depending on the welding speed. A welding speed of approximately 0.6 to 1.5 m/min is preferably used. With 18 mm thick plates for example, through the upstream laser hybrid method, the lower 8 mm of the joint are filled and the downstream HP-MAG process fills the remainder of the joint with a filler wire of 1.6 mm diameter. In order to fuse the wire at the said relatively high speeds and to achieve a sufficient filling degree, a corresponding high performance welding apparatus is to be used.

According to the device, the method for connecting components of heat-meltable, metallic materials is carried out with a robot-controlled welding unit, which carries out the hybrid welding process, namely a submerged arc-welding process (SAW) in combination with a laser welding process. This welding unit is coupled with a structural unit to carry out a high performance metal active gas process (HP-MAG) following the hybrid welding process. When the welding unit is guided along the seam which is to be welded, between the thick plates which are to be connected with each other, the structural unit coupled therewith with the HP-MAG torch likewise follows the welding unit at a predetermined interval.

The welding unit which is guided by a robot can be provided with a carrier on which the structural unit which carries the HP-MAG welding torch can be simply mounted. Vice versa, of course, the structural unit can have a carrier which is mounted on the welding unit.

The carrier is advantageously constructed so that the torch or respectively torches held thereon can be adjusted with regard to their spacing and their alignment to the welding direction.

An example embodiment of the invention, from which further inventive features emerge, is illustrated in the drawing.

The drawing shows a diagrammatic side view of a device for carrying out the welding method.

The device for permanently connecting components, here a thick plate 1 for shipbuilding made of heat-meltable metallic material, has a robot-controlled welding unit 2. When the robot-controlled welding unit is guided in the welding direction according to arrow VS, in so doing it moves a torch 3 arranged on the welding unit, by which a submerged arc welding process (SAW) is carried out. At the same time, a laser beam guiding component 4, likewise situated on the welding unit, is also moved, so that finally the welding unit 2, with movements along the thick plate 1, with a predetermined speed carries out a hybrid welding process in the direction of the arrow VS. With a screw connection, indicated here diagrammatically by the hexagon head 5, a carrier 6 is mounted on the welding unit 2. The carrier carries a structural unit 7 on which a torch 8 is held to carry out a high performance metal active gas welding process (HP-MAG).

The SAW torch 3 is aligned in a dragging manner in relation to the welding direction VS. The HP-MAG torch 8 is aligned in a piercing manner, likewise in relation to the welding direction VS.

The invention claimed is:

1. A method for permanently connecting components of heat-meltable metallic material, comprising the following steps:
  carrying out a hybrid welding process with a robot- controlled welding unit comprising a submerged arc welding (SAW) torch, the SAW torch being guided so as to be aligned in a dragging manner by the welding unit; and
  carrying out a High Performance Metal Active Gas welding process (HP-MAG) at a predetermined interval following the hybrid welding process, as soon as a weld seam in the hybrid welding process begins to cool down.

2. The method according to claim 1, wherein a structural unit, carrying out the HP-MAG welding process, is entrained by the robot-controlled welding unit to carry out the hybrid welding process.

3. The method according to claim 2, wherein a HP-MAG torch is used for the high performance metal active gas welding process (HP-MAG), and wherein the HP-MAG torch is guided in a piercing manner with the structural unit dragged by the welding unit.

4. The method according to claim 1, wherein the welding processes are carried out with a welding speed of approximately 0.6 to 1.5 m/min.

5. A device for connecting components of heat-meltable metallic material, comprising:
  a robot-controlled welding unit to carry out a hybrid welding process, the welding unit having a SAW torch that is guided so as to be aligned in a dragging manner by the welding unit; and
  a structural unit to carry out a High Performance Metal Active Gas welding process (HP-MAG), following the hybrid welding process, said structural unit being coupled with the welding unit.

6. The device according to claim 5, wherein an interval between the welding unit and the structural unit is approximately equal to 150 to 400 mm.

7. The device according to claim 5, wherein the welding unit has a carrier on which the structural unit is mounted.

\* \* \* \* \*

UNITED STATES PATENT AND TRADEMARK OFFICE
CERTIFICATE OF CORRECTION

PATENT NO. : 8,378,260 B2
APPLICATION NO. : 12/451444
DATED : February 19, 2013
INVENTOR(S) : Werner Knipper It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this
First Day of September, 2015

Michelle K. Lee
*Director of the United States Patent and Trademark Office*